(12) United States Patent
Ehrenleitner

(10) Patent No.: US 9,352,468 B2
(45) Date of Patent: May 31, 2016

(54) MANIPULATOR

(75) Inventor: Franz Ehrenleitner, Altensteig-Walddorf (DE)

(73) Assignee: EB-INVENT GMBH, Altensteig-Walddorf (*) Notice: Subject to any disclaimer, the term of this patent is extended or adjusted under 35 U.S.C. 154(b) by 168 days.

(21) Appl. No.: 14/005,634

(22) PCT Filed: Mar. 13, 2012

(86) PCT No.: PCT/EP2012/001111
§ 371 (c)(1), (2), (4) Date: Sep. 17, 2013

(87) PCT Pub. No.: WO2012/123102
PCT Pub. Date: Sep. 20, 2012

(65) Prior Publication Data
US 2014/0001318 A1    Jan. 2, 2014

(30) Foreign Application Priority Data

Mar. 17, 2011  (DE) .......................... 10 2011 014 365
Feb. 9, 2012   (DE) .......................... 10 2012 002 400

(51) Int. Cl.
*A47F 5/00* (2006.01)
*B25J 11/00* (2006.01)
(Continued)

(52) U.S. Cl.
CPC ............... *B25J 11/00* (2013.01); *A61G 7/008* (2013.01); *B23Q 1/5462* (2013.01); *B25J 9/0048* (2013.01); *B25J 17/0266* (2013.01); *B66F 7/22* (2013.01); *Y10T 409/30924* (2015.01)

(58) Field of Classification Search
CPC ...... B25J 17/0266; B25J 11/00; B25J 9/0045; B25J 9/0051; B25J 9/065; B25J 9/003; B25J 9/0072; B66F 7/22; A61G 7/008; Y10T 409/30924; B23Q 1/5462
See application file for complete search history.

(56) References Cited

U.S. PATENT DOCUMENTS 4,569,627 A * 2/1986 Simunovic ................. B25J 9/04
                                                33/613
5,156,062 A * 10/1992 Appleberry .......... B25J 17/0266
                                                74/490.01
(Continued)

FOREIGN PATENT DOCUMENTS

GB     2149733       6/1985
WO     8404503 A     11/1984
WO     03066288 A    8/2003

OTHER PUBLICATIONS

Xianwen Kong and Clement H. Gosseiin: "Type Synthesis of Three-Degree-of-Freedom Spherical Rara].lel Manipulators", The International Journal of Robotics Research, Voi. 23, No. 3, Mar. 2004, pp. 237-245, DOi: 10.1177/0278364904041562 retrieved from the Internet am i0.05.2012: http://i jr. sagepub, corn/content/23 / 3/237. full_. pdf+html.*

*Primary Examiner* — Christopher Garft
(74) *Attorney, Agent, or Firm* — Lucas & Mercanti, LLP; Klaus P. Stoffel

(57) ABSTRACT

A device for turning an object about an axis which is stationary related to the device, the device including two manipulator modules, each provided with a base part, to which, rotatable on a base axis, an upper arm is linked, to which, rotatable on an arm axis, a lower arm is linked, which features an end axis. The base axis, the arm axis and the end axis of each manipulator module intersect with each other respectively in one intersection point, with their connecting line defining the swivel axis. A connecting piece is mounted between the two lower arms so that it is rotatable on the two end axes and forms and/or provides an object holder for the object to be turned/swiveled.

7 Claims, 13 Drawing Sheets

(51) Int. Cl.
*B25J 9/00* (2006.01)
*A61G 7/008* (2006.01)
*B66F 7/22* (2006.01)
*B23Q 1/54* (2006.01)
*B25J 17/02* (2006.01)

(56) References Cited

U.S. PATENT DOCUMENTS

| | | | | | |
|---|---|---|---|---|---|
| 5,656,905 | A * | 8/1997 | Tsai | | B23Q 1/5462 318/560 |
| 5,960,672 | A * | 10/1999 | Pritschow | | B23Q 1/5462 74/490.03 |
| 6,024,576 | A * | 2/2000 | Bevirt | | A61B 19/22 345/158 |
| 6,047,610 | A * | 4/2000 | Stocco | | B25J 17/0266 74/479.01 |
| 6,059,703 | A * | 5/2000 | Heisel | | B23Q 1/5462 248/631 |
| 6,155,758 | A * | 12/2000 | Wieland | | B23Q 1/015 409/201 |
| 6,418,811 | B1 * | 7/2002 | Rosheim | | B25J 17/0266 414/729 |
| 2002/0015624 | A1 * | 2/2002 | Wang | | B23Q 1/5462 409/201 |
| 2003/0121351 | A1 * | 7/2003 | Gosselin | | B25J 17/0266 74/490.05 |
| 2005/0159075 | A1 * | 7/2005 | Isobe | | B25J 17/0266 446/104 |
| 2006/0213308 | A1 * | 9/2006 | Rosheim | | B25J 17/0266 74/490.01 |
| 2006/0283010 | A1 * | 12/2006 | Rieck | | B21C 37/125 29/799 |
| 2007/0173976 | A1 * | 7/2007 | Schena | | A61B 19/22 700/245 |
| 2007/0248428 | A1 * | 10/2007 | Ota | | B23Q 1/4857 409/201 |
| 2009/0143907 | A1 * | 6/2009 | Demathelin | | A61B 19/22 700/245 |
| 2010/0043577 | A1 * | 2/2010 | Rosheim | | B25J 17/0266 74/5.4 |
| 2010/0101359 | A1 * | 4/2010 | Breu | | B25J 17/0266 74/490.06 |
| 2011/0010858 | A1 * | 1/2011 | Tesar | | A61G 7/005 5/608 |
| 2011/0126660 | A1 * | 6/2011 | Lauzier | | B25J 17/0208 74/490.05 |
| 2012/0043100 | A1 * | 2/2012 | Isobe | | A61B 17/1631 173/42 |
| 2013/0099085 | A1 * | 4/2013 | Schwab | | B23Q 1/5462 248/349.1 |
| 2014/0227023 | A1 * | 8/2014 | Sone | | B25J 9/0048 403/180 |
| 2015/0082934 | A1 * | 3/2015 | Trui | | F16M 11/123 74/490.01 |
| 2015/0088308 | A1 * | 3/2015 | Isobe | | B25J 9/0048 700/245 |

* cited by examiner

MANIPULATOR

The present application is a 371 of International application PCT/EP2012/001111, filed Mar. 13, 2012, which claims priority of DE 10 2011 014 365.3, filed Mar. 17, 2011, and DE 10 2012 002 400.2, filed Feb. 9, 2012, the priority of these applications is hereby claimed and these applications are incorporated herein by reference.

BACKGROUND OF THE INVENTION

The present invention relates to a Manipulator, namely a device for turning an object about an axis that is stationary relative to the device.

Manipulators for supporting objects, mostly high-mass and large-sized ones, such as a truck chassis or even superstructures of airplanes, parts to weld and for turning/rotating them on a horizontal axis to allow for better access in case of repair or assembly work are already known in the form of so-called gyrowheel (or Rhönwheel)-turning devices. Depending on the desired pivoting angle, at least two concentrically arranged, closed (slotted) circular guidances or open circular arc guidances, both summarized as circular guidances in the following, supported on suitable rollers or supported in counter rests in a sliding manner, so that an object, which is fixated at the circular guidances, executes a pivoting movement about the axis which is defined by the two centers of the circle.

Based on this construction, the diameter of the gyrowheel (Rhönwheel) is basically restricted in vertical direction by the surrounding periphery and therefore, the respective maximum height of the rotation axis is given by the basis of the gyrowheel (Rhönwheel) device. In many cases, it is necessary to mount the object to be worked on in such way that its center of gravity is located above the rotation axis what will lead to an intrinsically instable and dangerous situation, as the object can roll over by up to 180°, if brakes and/or drives fail. Furthermore, due to this relatively low position of the rotation axis, there is the risk with objects/components projecting on the sides that the object's outer parts collide with the floor and/or the angle of rotation will be restricted to an extent that the accessibility is impaired.

Turning devices are useful for applications where a lying patient is to be moved to a suitable position at a diagnostic device or treatment device or to the doctor without the patients having to change their position on the bed. However, this is only known to be existant in the form of adjustable head and foot sections of beds. Beyond that, also in other cases like on hospital beds, medical examination or treatment chairs, especially in the field of dentistry and gynecology; or with so-called Shuttles for the transport of patients, especially the relative height between the head and feet of the patient should be adjustable as easily and reliably as possible.

SUMMARY OF THE INVENTION

The invention has the aim to present a device which does not have these disadvantages, which saves space, and in particular which can do without the costly circular and/or circular arc guidances, and which improves the accessibility to the lower side of the respectively fixated/clamped object and which improves safety. It is also especially intended to enhance the range of application of those Manipulators, in particular in the field of medicine.

In other words, the free ends of two Manipulator modules with three rotation axes on each, which all intersect with each other in one intersection point, are connected to each other by means of a connecting piece (yoke) which is rotatable about parallel rotation axes and on which a mounting plate for the object to be manipulated/turned is provided for and/or formed. Preferably, the mounting plate at the connecting piece (yoke) is fixated in such way that it can be moved in one direction which runs parallel to the swivel axis.

In this way, it is possible to choose the rotation axis of the object nearly as high as one likes and thus to ensure that the center of gravity of the object (this includes also patients) is always at a lower level than the rotation axis. Therefore, there is no rolling over of the object, even in the case of failure of all drives and brakes; it will just cease swinging. The invention allows an asymmetric arrangement of the base parts of the two Manipulator modules with respect to the vertical plane through the rotation axis, thus enabling an excellent accessibility to the bottom side of the object. If the embodiment is provided with a movable clamping plate relative to the connecting piece, the accessibility and turning range will be increased even more. On one embodiment, the two Manipulator modules are mounted and arranged symmetrically to each other related to the plane of symmetry between the two intersection points; this is advantageous, because storage and construction and maintenance will be simple, however this is not necessary.

In addition, a completely unexpected possibility of application turned up for the case, in which the rotation axis is designed to be at a lower level instead of a higher level and the object clamped is, for example, a sheet metal which needs to be bent. Then it is possible to bend the sheet metal appropriately by operating the device about the swivel axis, which then corresponds with the bending line, on a correspondingly constructed bending device, whereby—on the one hand—particularly great forces can be applied, and—on the other hand—complex sequences of bending procedures can be executed.

The device according to the invention can also be used beneficially in other fields of application, such as in machine tool engineering, especially with milling machines, where the tool axis is to be swiveled about an axis, mostly a (imaginary) line on the surface of the work piece. Even with robots designed for holding and moving work pieces, this device according to the invention can be used, for example to create a virtual hand axis.

The invention is explained in more detail by help of the drawing hereinafter.

DETAILED DESCRIPTION OF THE INVENTION

Figure 1:
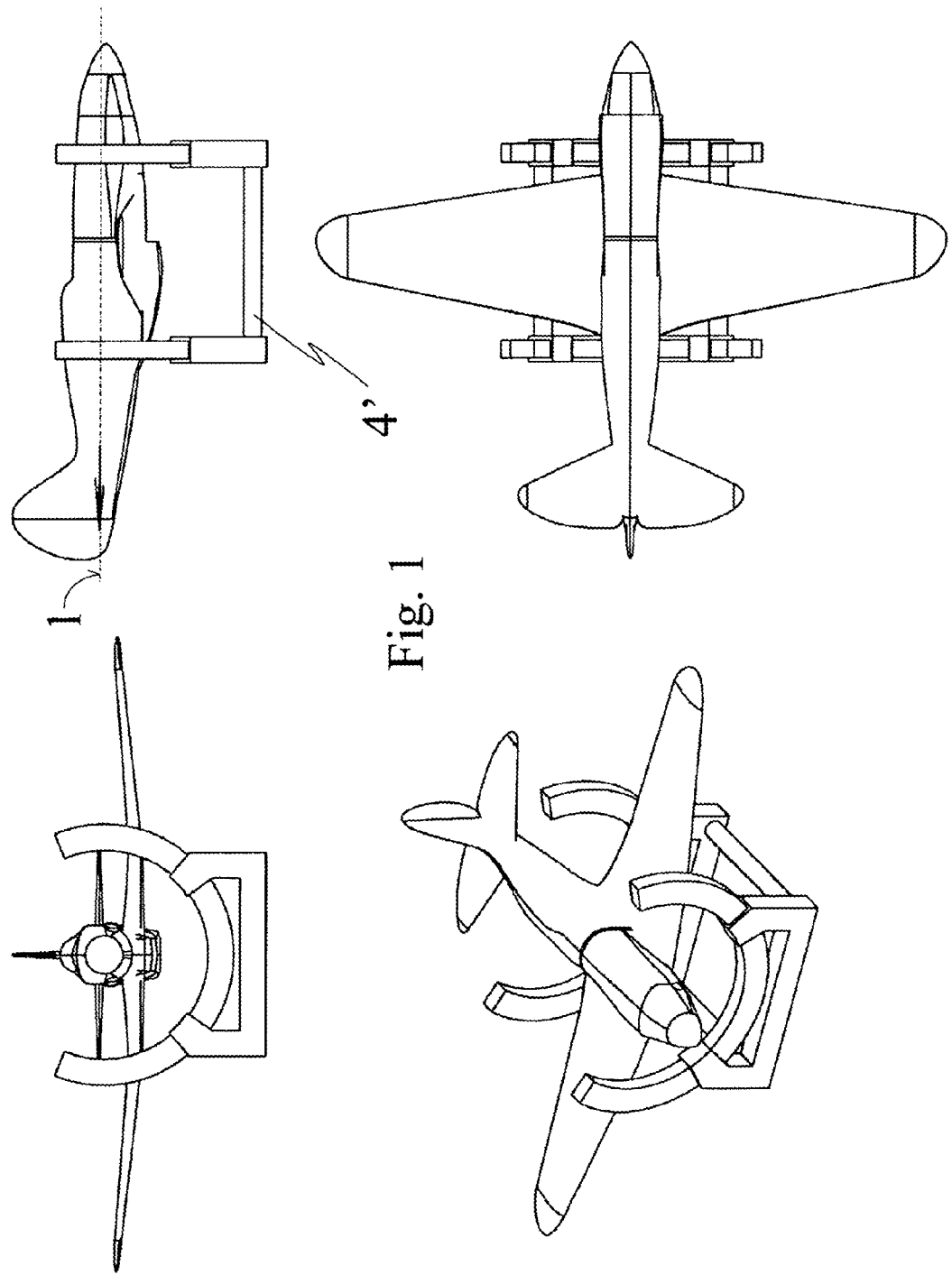
In FIG. 1, a gyro wheel (Rhönwheel) turning device according to prior art is illustrated in four different views.

FIG. 1 shows a turning device which corresponds to prior art in four different views. The illustrated device is capable to turn a large object such as the sporting airplane shown in the drawing around a given swivel axis 1. Even if no 180°-turn is possible, the term turning device and/or turning/rotation axis is being used. As is visible from the figure, the length of the turning axis depends on the diameter of the gyro wheel/Rhönwheel, which is restricted again by the structural conditions. In this example, the swivel axis 1 runs within the area of the center of gravity of the object mounted, which is favorable due to a better turnability at a greater distance. On the other hand, for safety reasons it should always be ensured that the center of gravity of the object remains reliably below the swivel axis 1 in order to avoid any rolling over of the whole device in case of failure of the drive and/or of the fixation of the gyro wheel/Rhönwheel. On the devices according to prior art, this pre-requisite is often not met.

In FIG. 1, it is also visible that the two gyro wheels/Rhönwheels which are needed for the construction of the device along with their supports make the access to the bottom side of the fixated object more difficult, even if the connecting pipes 4' between the two gyro wheels/Rhönwheels and/or their supports (as is shown in the drawing) are located in realitas below the floor surface and/or are replaced by single foundations; in FIG. 1, the pipes are included in the drawing to show that the supports belong together.

Figure 2:
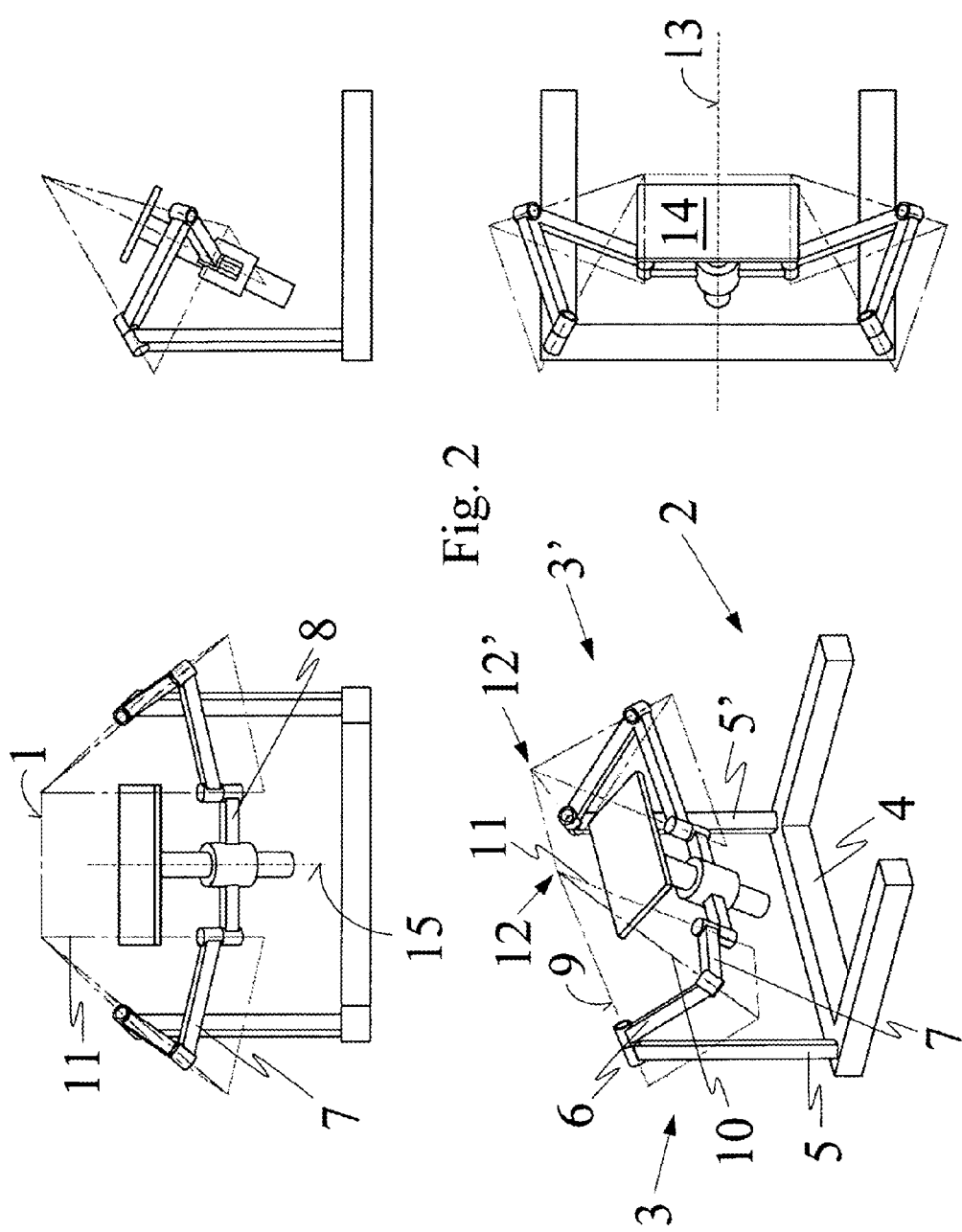
FIG. 2 shows a device according to invention in four different views.

The invention is shown in schematic illustration in FIG. 2. A device according to the invention 2 consists of two Manipulator modules 3, 3', the base parts 5, 5' of which are connected with each other in a rigid manner, as is indicated by the connecting rod 4, and by the connecting pipes 4' of FIG. 1, with the base parts 5, 5' of the Manipulator modules 3, 3' fixated in the shop floor foundation.

The Manipulator module 3 consists—in addition to the already mentioned base part 5—of an upper arm 6, which is connected with the base part 5 and can be rotated about a base axis 9. On the other end of the upper arm 6, a lower arm 7 is linked, which rotates about an arm axis 10. The arm axis and the base axis cut each other in an intersection point 12. On the other end of the lower arm 7, a connecting piece (yoke) 8 is linked which is rotatable about an end axis 11 of the lower arm 7, the end axis 11 also cuts in the intersection point 12.

The second Manipulator module 3'—as shown in the illustrated embodiment—has completely the same structure as Manipulator module 3, provided that it is arranged symmetrically to a plane of symmetry 13 between the two intersection points 12, 12'. As a consequence, the plane of symmetry runs vertical between the two base parts 5, 5' and through the middle of the connecting piece (yoke) 8. Keeping to these conditions is favorable for manufacturing reasons, but it is not a pre-requisite for achieving the purpose according to the invention. Especially, if the working processes require asymmetrical maximum movements, a correspondingly asymmetrical arrangement of the Manipulator modules can be advantageous, taking this into account.

The straight line between the two intersection points 12, 12' represents the swivel axis 1 of the device according to the invention for the connecting piece (yoke) 8 and the objects mounted on it. This is explained in more detail as follows:

The end axes 11, 11' in the present illustrated embodiment run vertically (in a normal plane) to the swivel axis 1 in each position of the Manipulator 2. This is also not a pre-requisite for achieving the purpose according to the invention. On the connecting piece (yoke) 8, there is preferably an object holder/support 14 mounted in a movable and fixable manner along a holder axis 15, the holder axis 15 cuts the swivel axis 1. This makes it possible to handle and work on work pieces of different sizes and/or shapes in an optimum position. Instead of the simple design solution of the movable mechanism, shown in the schematic illustration, of course, also other design solutions are possible, where several linearly movable elements are used; however, it is crucial that the movement is executed in the direction to and/or away from the swivel axis 1.

It can easily be seen from the synopsis of the individual illustrations in FIG. 2 that an asymmetric design of the device 2 (seen in the direction of the swivel axis 1) provides optimum accessibility to the object (including a patient), and, especially the base parts 5, 5' here restrict considerably less the access to the bottom side of the object than the extensive gyro wheels (Rhönwheels) do—including their supports.

As the orientation of the axes: Base axis 9, Arm axis 10 and End axis 11 as well as the length of the upper arm and the lower arm can be freely chosen in a large range, it is possible to design the intersection points 12, 12' at nearly any height; only the lateral deflection, which has to be taken into account for each angular unit, will set the limits here. The device has a high stability, the components and bearings needed for the construction are inexpensive and robust. As a drive means—as is known from the state-of-the-art, a motor can be used for the bearings, but, provided that the required angular positions are achieved, also actuators can be used between the individual arms. Such actuators can also be applied directly at the connecting piece 8 or even at the object holder and in special cases also at the object itself. In these cases, the device has the only task to guide the object. The fact that also brakes and safety devices are provided for, does not affect the invention itself and will therefore not be explained in detail.

In terms of kinematics, as can be easily seen from the synopsis of the individual illustrations in FIG. 2, the horizontal position of the swivel axis 1 above the connecting rod 4, which indicates the floor area, can be raised to a very high level, so that it becomes possible to locate the center of gravity of the clamped object at a reliably lower level than that of the swivel axis 1. At the same time, on the embodiment of the invention, where the object holder 14 relating to the connecting piece (yoke) 8 is mounted in a movable and fixable manner, the distance between center of gravity of the object and the swivel axis is easily adjustable. With regard to the object holder 14, it has to be mentioned that, to simplify matters, it is illustrated here as a rectangular board in the respective figures; in real embodiments, an adaption to the respective object (for example as a stretcher for patients) is easily applicable.

Figure 3:
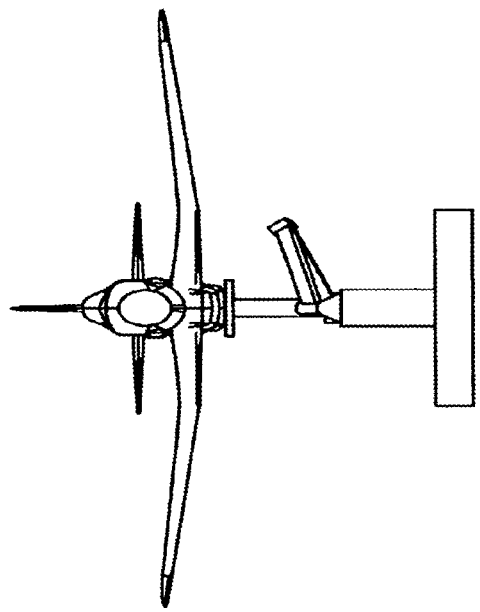
FIG. 3 shows a view of the device of FIG. 2 with a stretched airplane in horizontal position.
Figure 3:
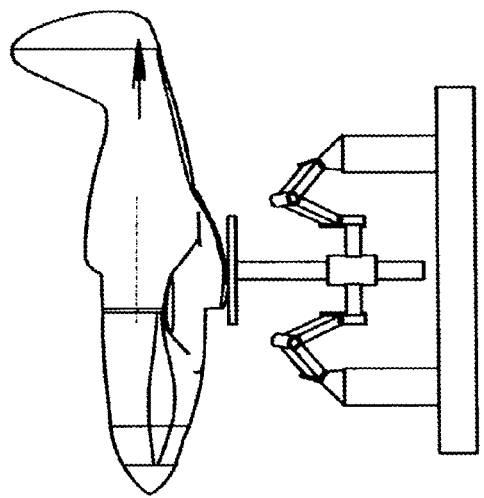
Figure 3:
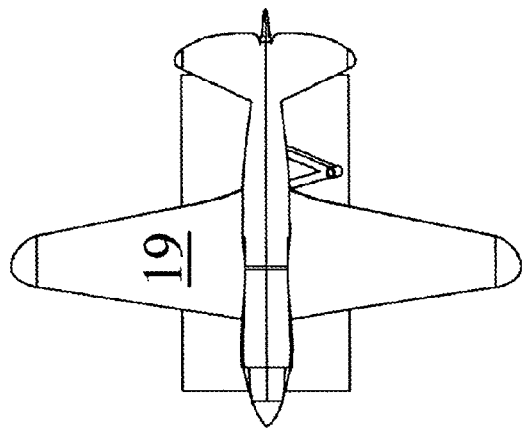
Figure 4:
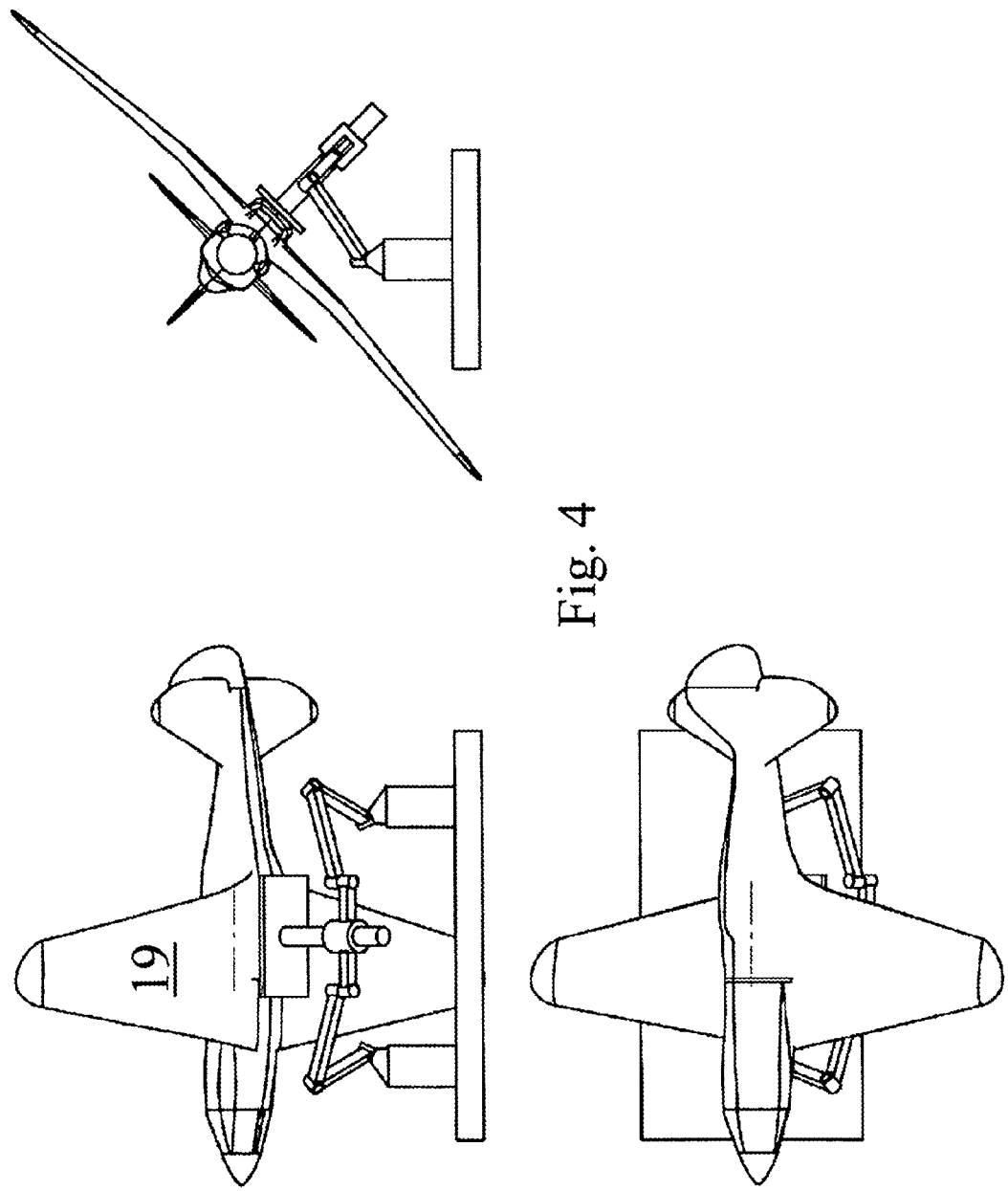
FIG. 4 shows the device of FIG. 3 in inclined position in three different views.

The FIGS. 3 and 4 show the situations of the clamped objects and their positions, if the device according to invention 2 is used for a sporting aircraft which corresponds to the one in FIG. 1. Especially in FIG. 4, the excellent accessibility can be seen; in FIG. 3, the device 2 with its asymmetric design in axial direction is shown, which enables especially the handling of objects which need to be accessed in an "asymmetric" manner, and allows clamping them in the respectively most suitable direction. The synopsis with FIG. 2 shows the possibilities of arranging and orientating the axes and the lengths and positions of the arms and the base the invention provides, with the swivel axis 1 running in the vertical plane through the two base parts 5, 5' on this embodiment; i. e. the base axes 9, 9' run in this vertical plane.

Figure 5:
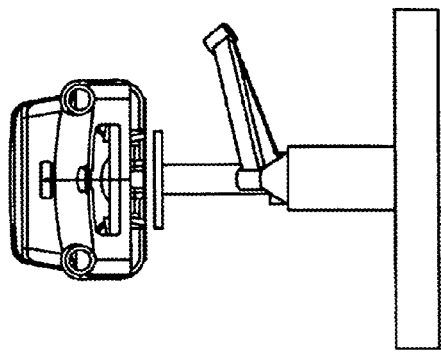
FIG. 5 and FIG. 6 show the device of FIG. 2 with a mounted vehicle chassis to illustrate the different assembly situations/conditions in the views corresponding to those in FIGS. 3 and 4.
Figure 5:
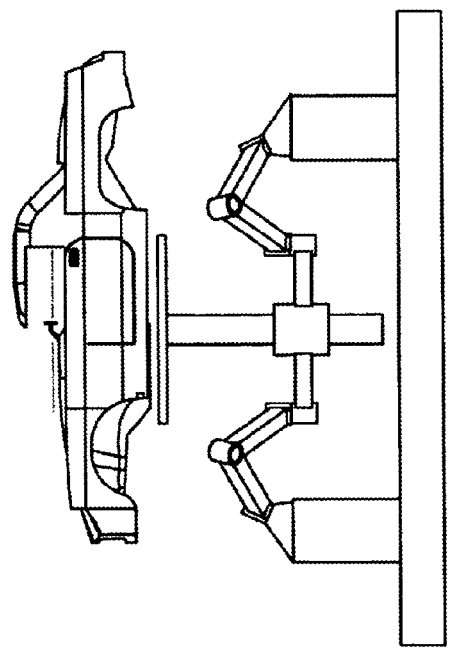
Figure 5:
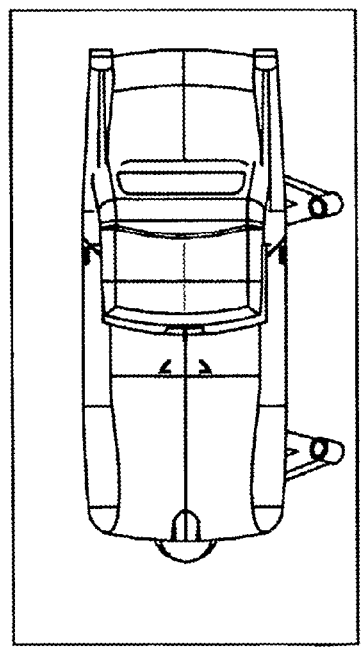
Figure 6:
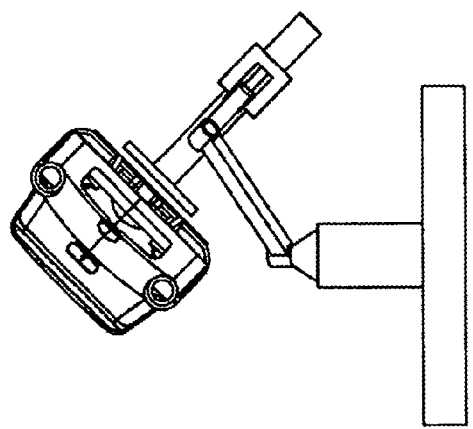
Figure 6:
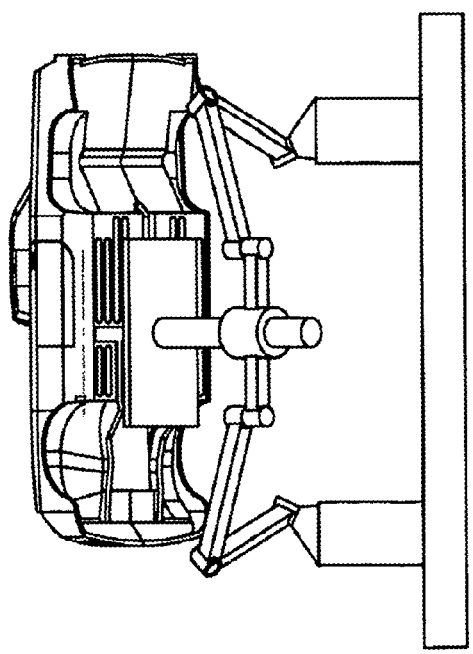
Figure 6:
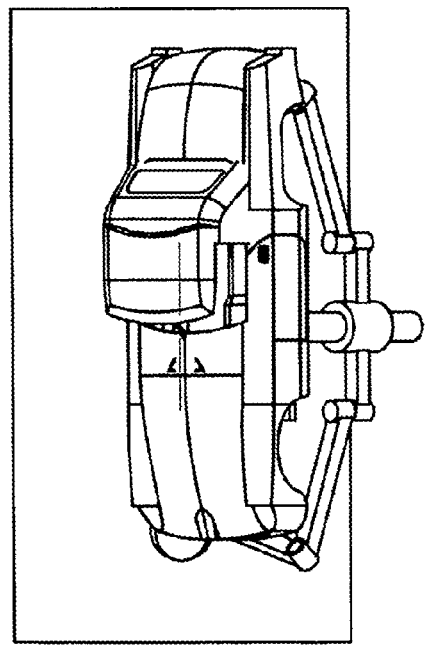

The FIGS. 5 and 6 show analogous situations as in FIGS. 3 and 4 with a clamped vehicle body, where the good accessibility is clearly visible, too.

The invention—like the gyro wheel (Rhönwheel)—allows for an object (including a patient) being turned/swiveled about a mechanically unrealized (virtual) swivel axis. However, the scope for design regarding the position of the swivel axis relative to the base of the device has been clearly improved in comparison with the gyro wheel (Rhönwheel) and it is always possible to position the center of gravity of the object at a lower level than the swivel axis which is important for safety reasons. Furthermore, it is possible to respond to asymmetrical accessibility conditions, both in the direction across the swivel axis and along the swivel axis (lengthwise). In addition to that, the invention enables the application of the device in application areas, where the gyro wheel (Rhönwheel) cannot be used.

Figure 7A:
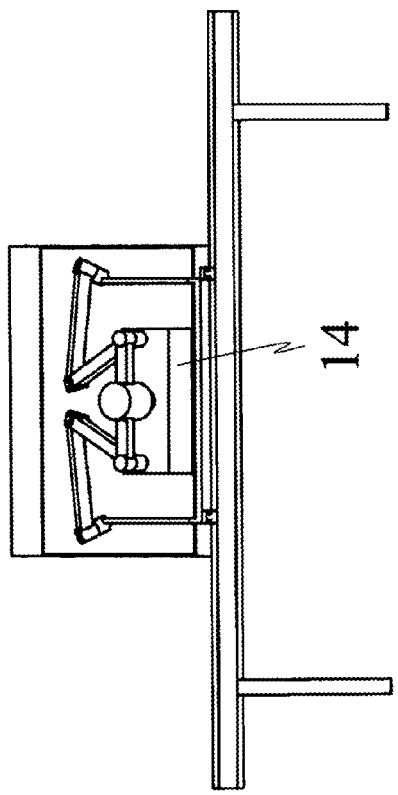
FIG. 7 shows a device according to invention in its embodiment as a bending device for sheet metal in three different views.
Figure 7B:
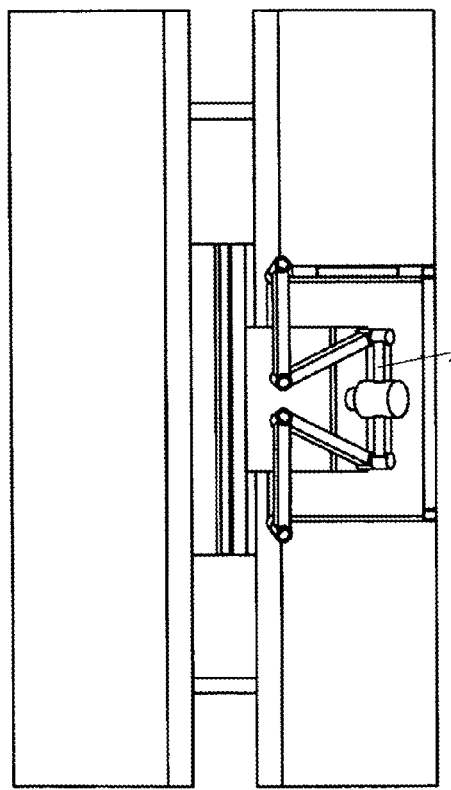
Figure 7C:
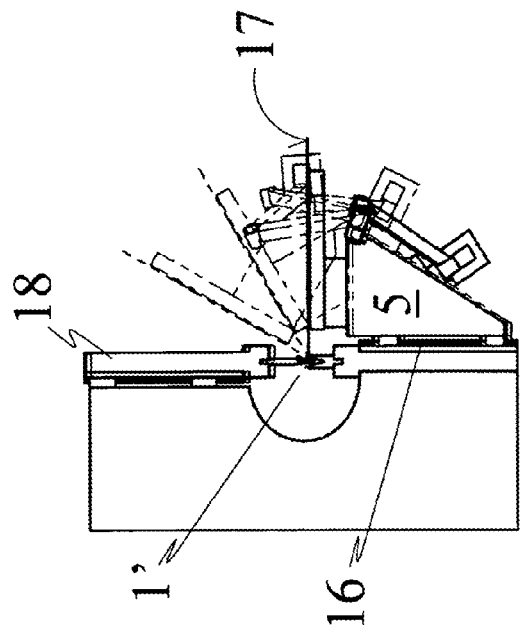
Figure 8:
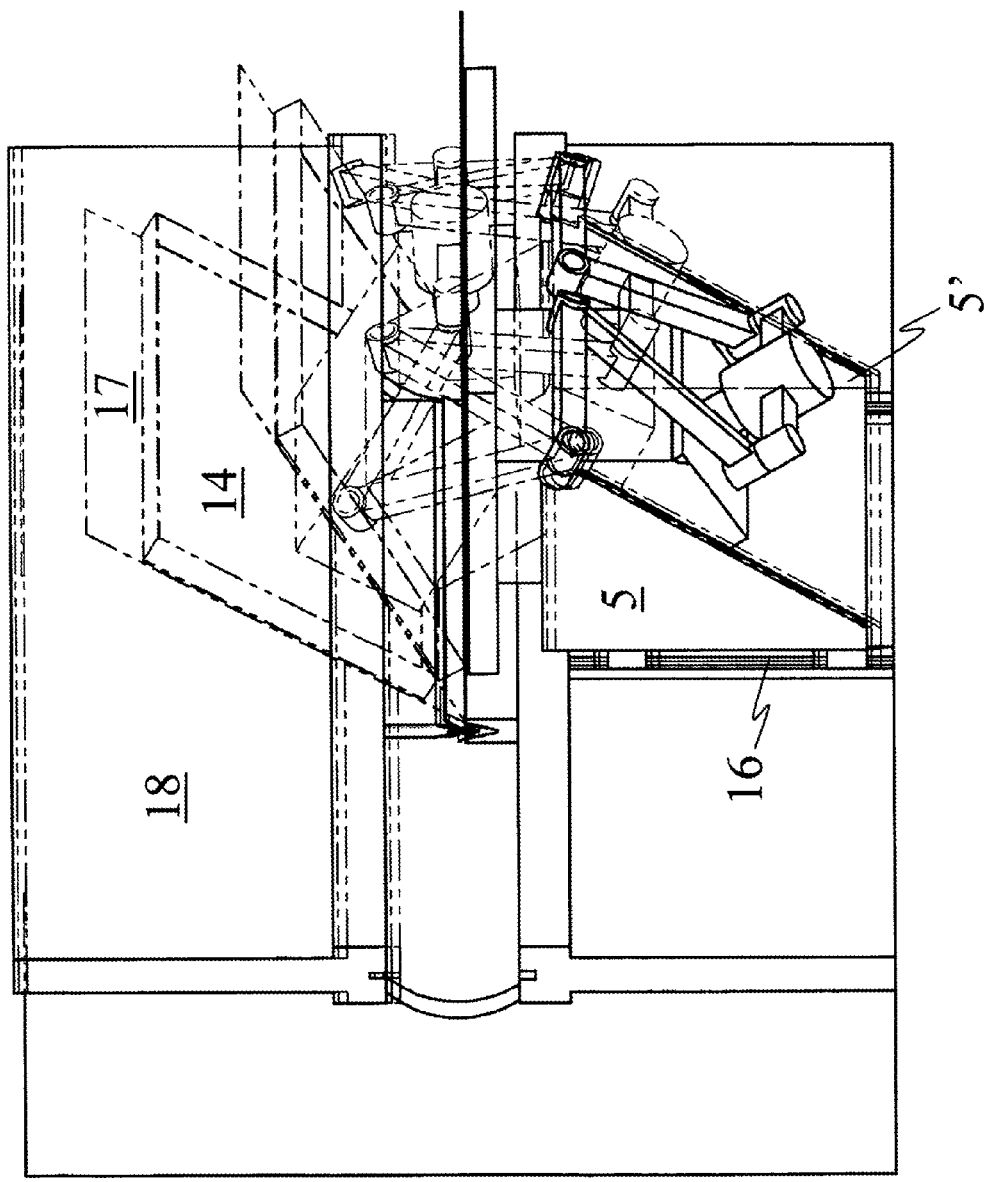
FIG. 8 shows a top view on the device according to FIG. 7 in three different positions.

The invention is—as mentioned at the beginning—also useful in other application areas where it is important to swivel objects about a space-fixed (raumfest) or at least device-fixed axis:

So the FIGS. 7 and 8 show the use of a device according to invention as a bending device. The FIGS. 7a to 7c show different views of such a device and the FIG. 7c shows a side view with the object holder in three different positions during such a bending procedure. The bending axis 1', which corresponds to the swivel axis 1, coincides with the bending axis and/or in the case of a press brake (which also fall within the scope of bending devices) with the edge bending line (opening line), and it is possible, during the bending movement, to move the base parts 5, 5' and along with them the device as a whole up and down along the guiding devices 16 in order to execute the appropriate movements, taking into account the respective sheet metal thicknesses and bend angles. This means that the bending axis 1' is pre-determined related to the turning device 2, but not related to the bending device.

It is clearly visible, especially from FIG. 7c (a front view) and from FIG. 7a (a bottom view), that the base parts 5, 5' are designed as solid, basically triangular sheet metals, which support the base axes on which the upper arms and the lower arms are mounted—completely analogous to the previously explained devices, with the upper arms and the lower arms jointly supporting the connecting piece (yoke) 8 on which the object holder 14, in the present case a sheet metal holder, is mounted. In this case, the movement of the object holder is effected preferably by a drive means directly acting on it, for example a linear drive, with its other end acting at an area connected with the base parts 5, 5'.

As is shown in FIG. 7c, the work surface of the object holder 14 is in horizontal position at the beginning of the bending procedure, a sheet metal to be bent 17 is suitably positioned on it and, if necessary, fixated, and a section of it, which is to be bent around the bending axis, protrudes beyond this bending axis. Then, a downward movement of the upper part 18 and the swiveling movement of the bending device are carried out, if necessary in accordance with the vertical movement of the entire bending device and with it the sheet metal 17, thus the sheet metal 17 is bent about and/or along the bending axis 1'.

The tools and the control of the feed motion and/or the bending movement can be easily calculated in the usual way based on the knowledge of kinematics and the invention and any particular explanation is not required here.

FIG. 8 shows these three steps in an inclined, but purely horizontal side view, the feed motion of the upper part 18 and the sequence of steps of the whole device with the base parts 5, 5' can be clearly seen here, as well as the device acting directly along the areas of the bending axis 1', where the bending of the sheet metal is carried out. Thus, the deformation/deflection of the object holder is clearly minimized in comparison with the devices according to prior art, where the forces on the swiveling sheet metal holder are always applied from the side so that the middle range of a beam loaded in bending will be deflected from the ideal line.

Figure 9A:
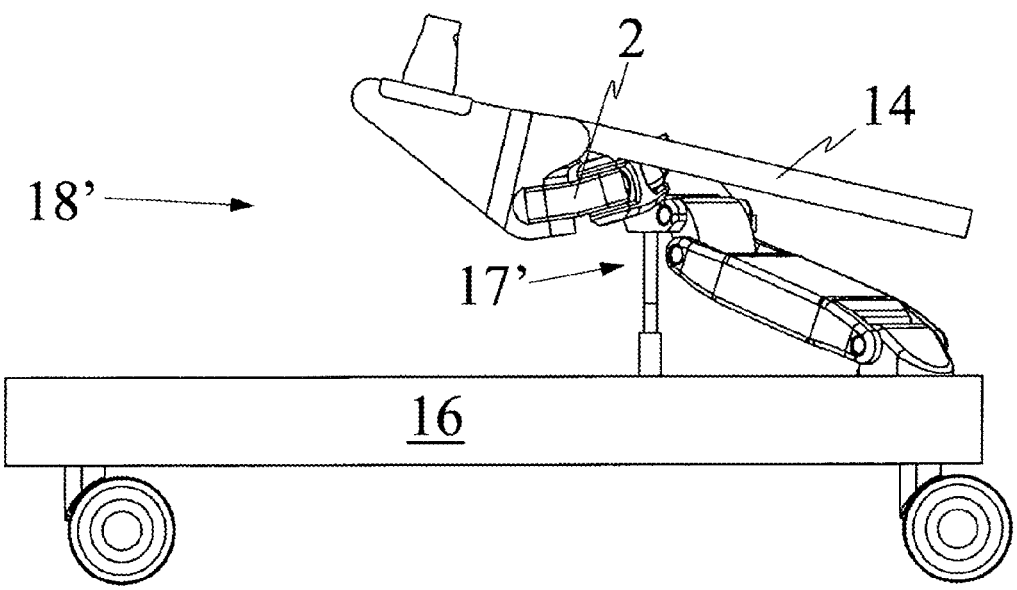
FIG. 9a and FIG. 9b show a Patients Shuttle with a device according to the invention in top view and side view.
Figure 9B:
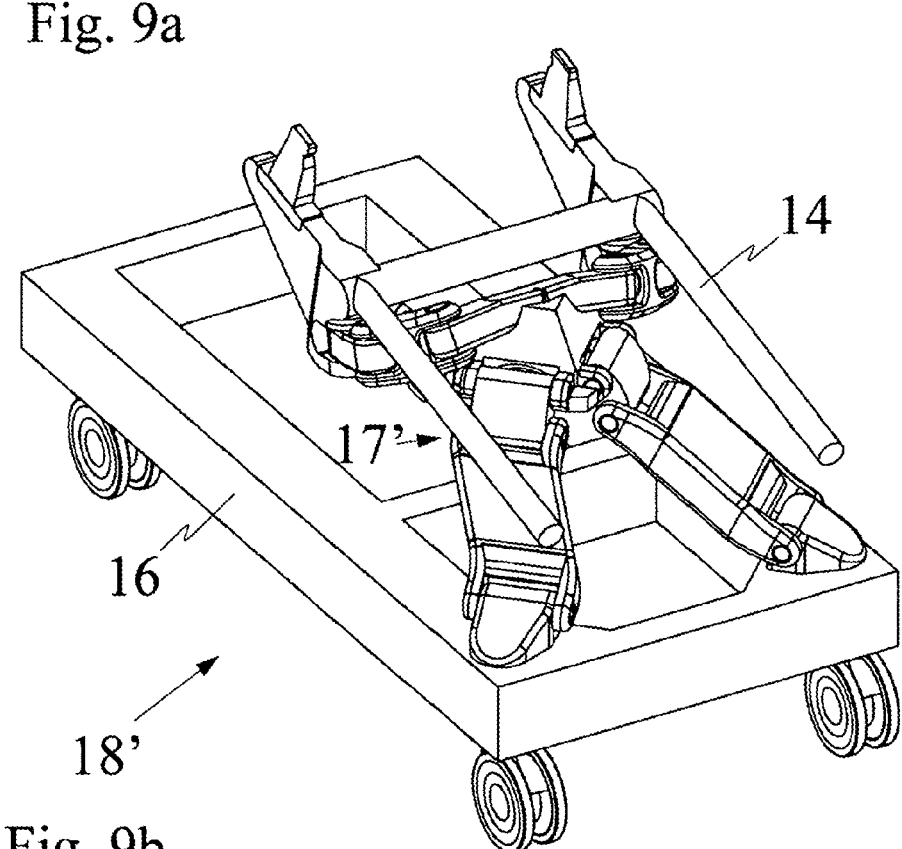

Another application, in the field of medicine, is illustrated and explained in the following: The FIGS. 9a and 9b show a base frame for a mobile hospital bed, a so-called Shuttle 18' or Patients' shuttle in medical jargon, with a mobile chassis 16, on which a height-adjustable mechanism 17' is mounted. The mechanism 17' carries a device according to invention 2 on its upper platform, the free end of which is the object holder 14, called simply a stretcher 14 in case of this embodiment.

Figure 13:
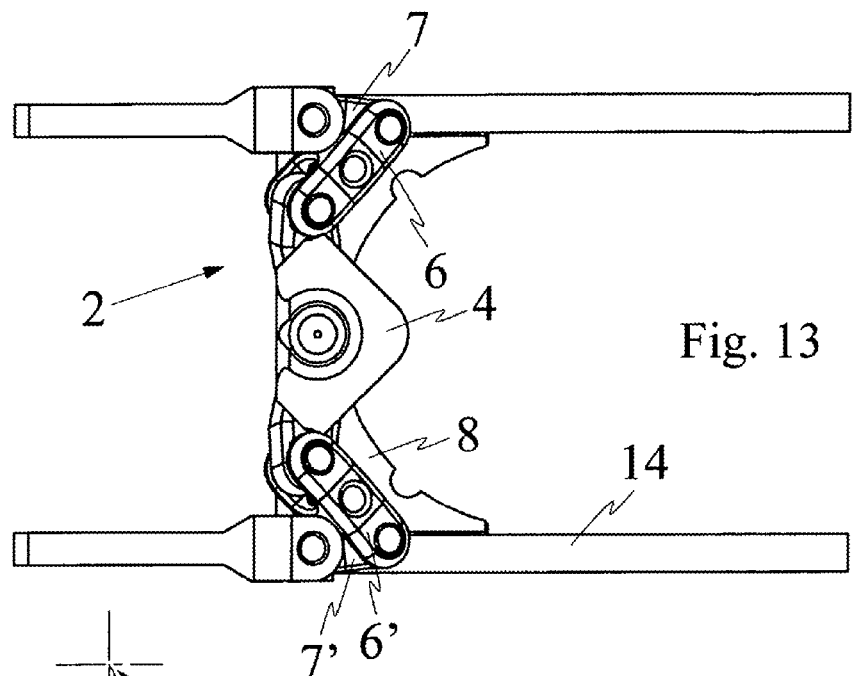
FIG. 13 shows a top view and FIG. 14 shows the application with a milling head.

The mechanism according to invention 2, as is realized and illustrated here, with regard to its functions corresponds completely with the mechanism 2 of FIG. 2, merely the dimensions and proportions have been chosen quite differently. This can be seen in particular from FIG. 12 and FIG. 13, which illustrate the device according to invention 2 of the Shuttle 18' separately, with the individual reference signs entered according to FIG. 2. In that way, FIG. 13 shows a bottom view and it is the plate in the middle 4 which is mounted on the height-adjustable mechanism 17'. Originating from the plate are the two upper arms 6, 6', on which the two lower arms 7, 7' are articulated. These, in turn, are each linked to a common connecting piece (yoke) 8. On the connecting piece (yoke) 8, the stretcher 14 is fixed in the illustrated embodiment.

Figure 12:
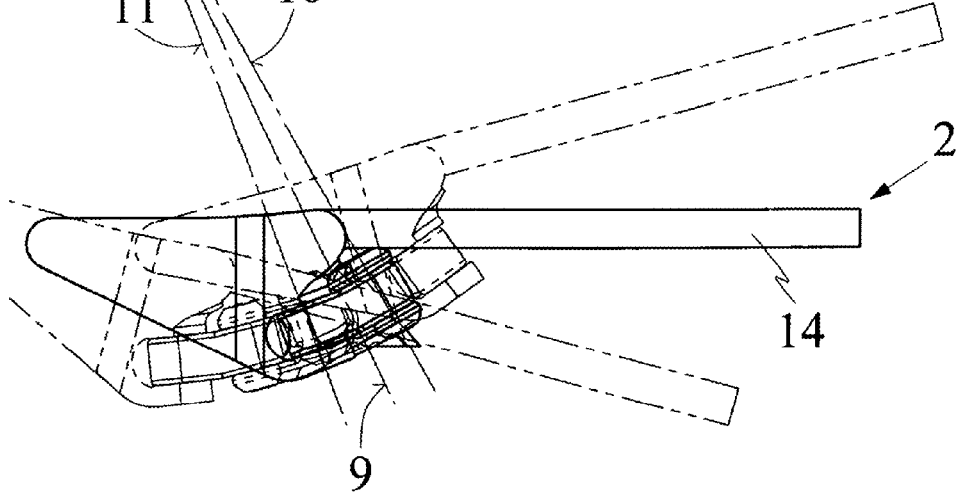
FIG. 12 shows the device of FIG. 9 in three (sequentially indicated) different positions in side view.

FIG. 12 provides a side view of the device 2, where for illustration purposes regarding the large-range pivoting angle also two inclined positions of the stretcher 14 are shown in dot-dash lines, and also the base axis 9, the arm axis 10 and the end axis 11 are shown. The intersection point 12, depicting the swivel axis, shows how eccentrically it may be positioned in relation to the object holder 14. If compared to FIG. 9, it becomes evident that this is the reason why it becomes possible to design the swivel axis 12 very exactly above the center of gravity of the stretcher 14 and/or the patient (not illustrated here), thus ensuring an optimum stability.

Figure 10:
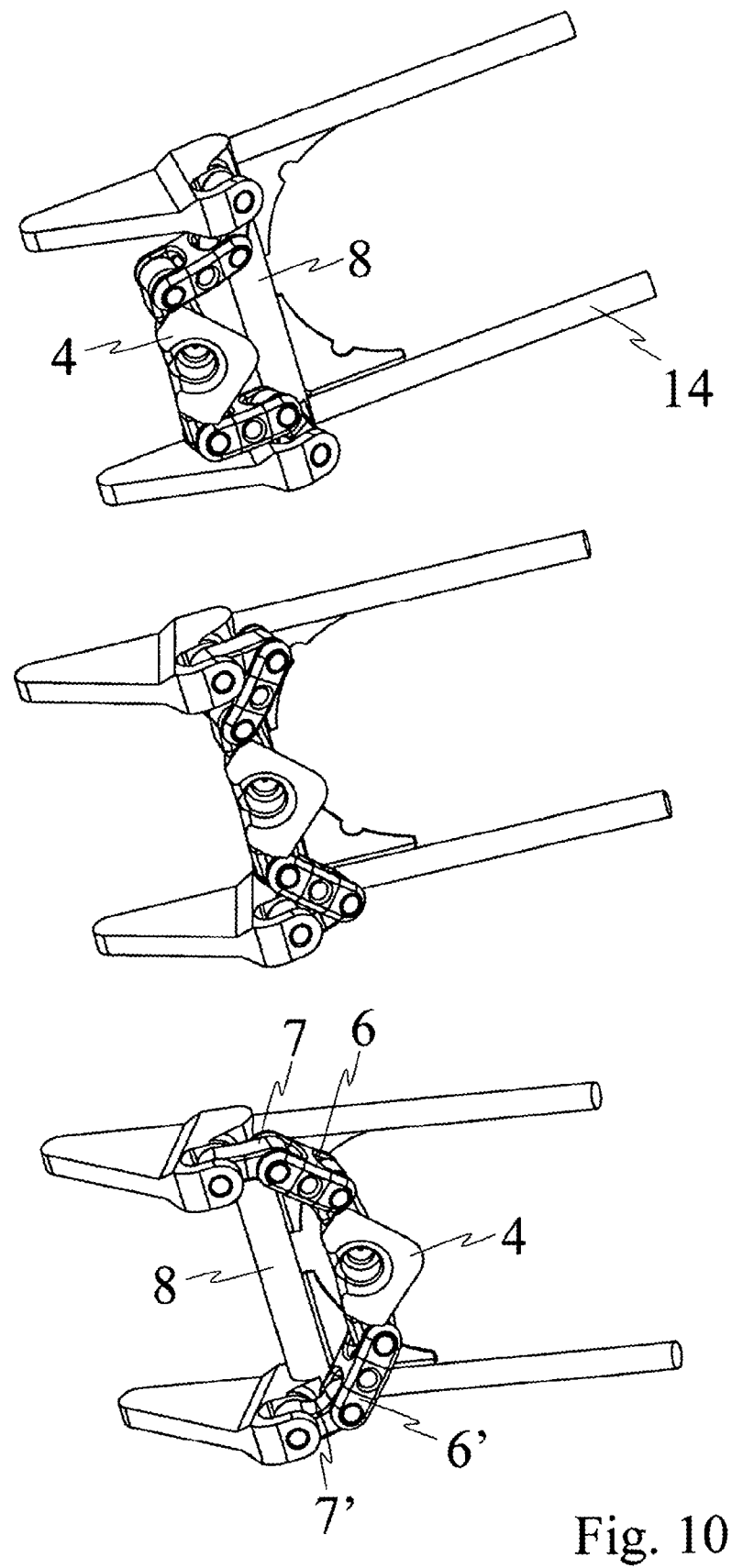
FIG. 10 shows the device of FIG. 9 in three different positions in perspective view.
Figure 11:
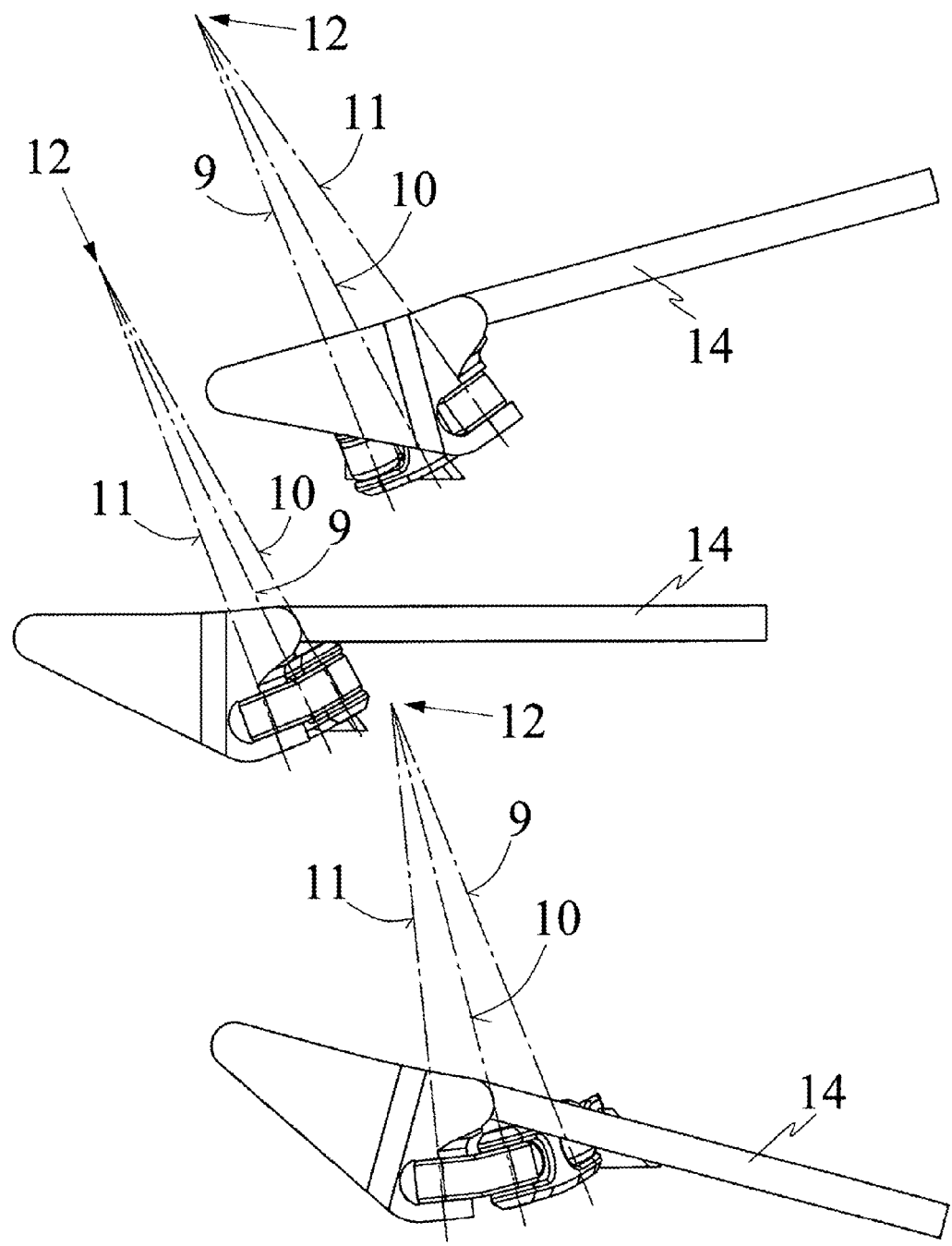
FIG. 11 shows the device of FIG. 9 in three different positions in side view.

The FIGS. 10 and 11 show a magnified detailed view and show the very compact mechanism of the device 2 which practically does not require much space and which, despite its compact design, provides a pivoting angle which is not achieved by state-of-the-art technology. FIG. 11 shows also, how the three axes 9, 10 and 11 move on and—as shown in the side view—depending on the respective swivel position, change their sequence (looked at it from the left hand side to the right hand side—or also from the right hand-side to the left), without creating a singularity.

In FIG. 10, the arms and joints of the axes are illustrated very clearly, in particular in the illustrated sequence of the movements.

Figure 14:
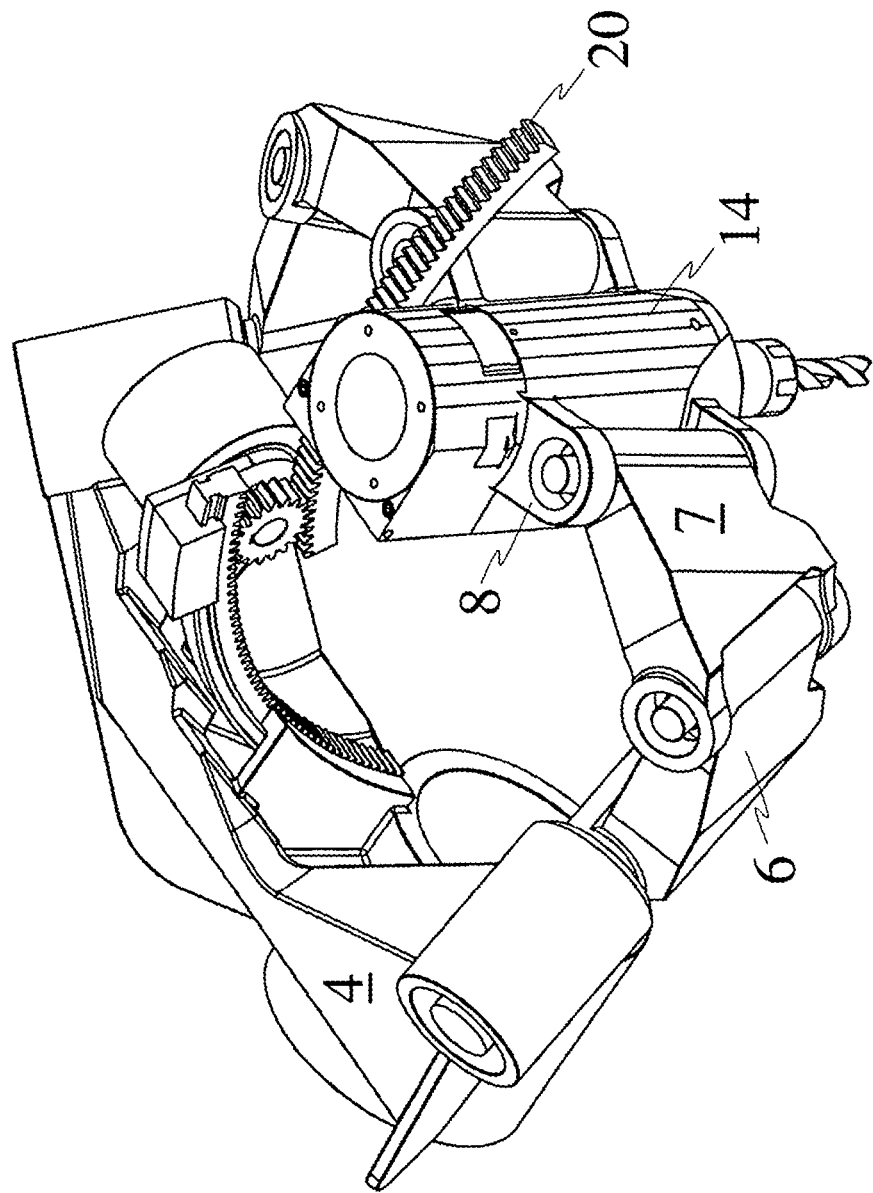

FIG. 14 shows how advantageous the invention can be applied on the holder of a milling cutter. The reference signs entered comply with those in FIGS. 2 to 8, and as both the operating principle and functionality are the same as explained above, there is no further explanation given regarding this. The "drive" means is a segment 20 of a gearing with gear wheel, which is, of course, replaceable by motors in the arms in the area of the respective rotation axes, however, it is inexpensive, accurate and robust.

Here, it is expressly referred to the considerable differences in size of the objects 19 to be swiveled for the different applications, which proves the universal applicability of the device according to invention.

The invention is not restricted to the embodiments illustrated and explained here, but can be modified in different ways and adapted to the various conditions. Thus, it is, of course, possible to use the invention for stationary beds and for beds without height-adjustment, in particular operating tables and stretchers and tables for examination purposes and treatment of patients (dentist chairs, gynecological examination chairs) can be equipped with it in an advantageous way; it is also useful for foldable light-weight stretchers or wheeled stretchers, how they are used in ambulance cars and outpatient departments.

The materials required such as stainless steel, aluminum and appropriately robust plastic materials are sufficiently available for the experts in the manufacturing industry of hospital equipment; with the knowledge of the invention it is no problem for the experts to accordingly select and dimension the materials.

Here, the adjustability at right angles to the stretcher's longitudinal axis has been described; such adjustability is, of course, also possible instead of or in addition to the longitudinal direction of the stretcher; this can be advantageous especially in the field of veterinary medicine where big operation tables etc. are used.

In other fields of application, there is, of course, an even larger range of possible variations: For example, with the knowledge of the invention and of the field of application, the length and the positioning of the arms and/or the size of the angles between the axes can be changed, the distance between the intersection points 12, 12' can be adapted to the respective fields of application, in particular the connecting piece (yoke) 8 and its connection to the object holder (stretcher) 14 and/or the integration of these parts in one single component, as well as the design solution of the object holder 14 are variable and adaptable in a large scope with the knowledge of the invention and the respective field of application; this applies in particular also to the design of the movable mechanism between the connecting piece (yoke) and the object holder. Depending on the field of application, the possibility to influence the relative position between the center of gravity and the swivel axis is more or less significant, whereas often the possibility to achieve large pivoting angles with swiveling devices which are compact in their space requirements becomes more and more important.

With the embodiment concerning the bending device, it becomes more even practical compared to the use with manipulators, to arrange two or more devices of that kind next to each other or one behind the other with the intersection points all aligned in order to evenly support particularly long sheet metal plates to be bent, but this is up to the creativity and interpretation of those skilled in the art and knowing the invention.

Another embodiment design provides for more arms on at least one of the Manipulator modules 3, 3', with the arms being rotatable about more arm axes which all cut in the intersection point 12, and that the connecting piece (yoke) 8 is mounted between the last two arms and rotatable about their two end axes. This causes one the one hand a mechanical under-determination; by not-binding at least one degree of freedom, which has to be compensated by drives, springs, etc., but this extends additionally the attainable pivoting angle.

The invention therefore allows—like the gyro wheel—to rotate/swivel an object about a swivel axis, which is mechanically not realized. However, the scope of design for the position of the swivel axis related to the base of the device is considerably improved and it is always possible to design the device in such way that the center of gravity of the object is lower than the swivel axis, what is important for safety reasons. Furthermore, it is possible to allow for asymmetric machining conditions, both, in the direction at right angle to the swivel axis and in longitudinal direction of the swivel axis. In addition to that, the invention enables the use of the device in other fields of application, other than the use as a turning device for particularly big work pieces such as car bodies, engines, housings, etc. but not limited to, and also bending devices, robots, tool holders on machine tools in particular, but not limited to as well as applications in the field of medicine; this is to be explained more in detail in the following:

In the field of medicine and orthopedics and rehabilitation technology, the invention makes work easier for the nursing staff and the doctors; changing the patient's position is carried out nearly automatically, bedsores are avoidable by a repeated changing of the inclined position i.e. the patient's position; gym equipment can be applied to improve mobility or rehabilitation measures of stroke patients.

In manufacturing technology, industrial handling technology and other fields, the turning of packages, sheet metal, work pieces by up to 90° and—in special cases—by an even larger angle becomes possible, including the automatic and/or largely automatic feeding of work pieces into machine tools; in principle, the turning of work pieces (e.g. in the field of welding technology as a manipulator or with motors/engines during their assembly) or tools like a milling head, laser cutters, waterjet, plasma etc., painting spray guns/nozzles, as a manipulator for carrying out inspections, quality checks, visual checks, where the simple movability (like a hand) about one axis in the area of the center of gravity is useful.

On assembly tables, for welded components, for satellite dishes, solar panels, etc. which have to be swiveled around virtual axes in the area of the satellite focus and in case of hail, to be tilted downwards.

For samples, work piece holding devices, work holding fixtures, for microscopic and/or macroscopic examinations, such as a microscope stage/specimen stage of a scanning electron microscope, a diffractometer or goniometer for X-ray examinations, where the sample/specimen needs to be or should be turned/swiveled about a virtual axis.

For bicycle saddles, to let it swivel around the contact point of the front wheel tire to enhance the riding pleasure; for movable seats and/or stretchers in the context of computer games or simulators such as flight simulators or for special-purpose vehicles, for example tanks.

The invention claimed is:

1. A device for turning an object about a swivel axis which is stationary in relation to said device, the device comprising: two manipulator modules, each manipulator module including a base part to which, rotatable on a base axis, an upper arm is linked, to which in turn, rotatable on an arm axis, a lower arm is linked, which has an end axis, wherein said base axis, said arm axis and said end axis of each manipulator module intersect with each other in respectively one intersection point, with a connecting line between the intersecting points defining said swivel axis; and a connecting piece supported rotatably on said two end axes is mounted between and directly connected to said two lower arms and provides and/or forms an object holder for the object to be turned.

2. The device according to claim 1, wherein said two manipulator modules are arranged symmetrically relative to a plane of symmetry between said two intersection points.

3. The device according to claim 1, wherein said end axes run in a normal plane to said swivel axis.

4. The device according to claim 1, wherein said object holder is mounted relative to said connecting piece in a movable manner in a direction towards said swivel axis and is fixable in various positions.

5. The device according to claim 1, wherein said base axes are situated in one plane.

6. The device according to claim 1, wherein a center of gravity of the object to be turned is located below a level of said swivel axis.

7. The device according to claim 1, wherein the object to be turned is a patient's stretcher, a bed, a treatment chair, or an examination chair.

\* \* \* \* \*